Dec. 13, 1949     J. B. GRAHAM     2,491,004
PIPE COUPLING
Filed March 5, 1947     2 Sheets-Sheet 1
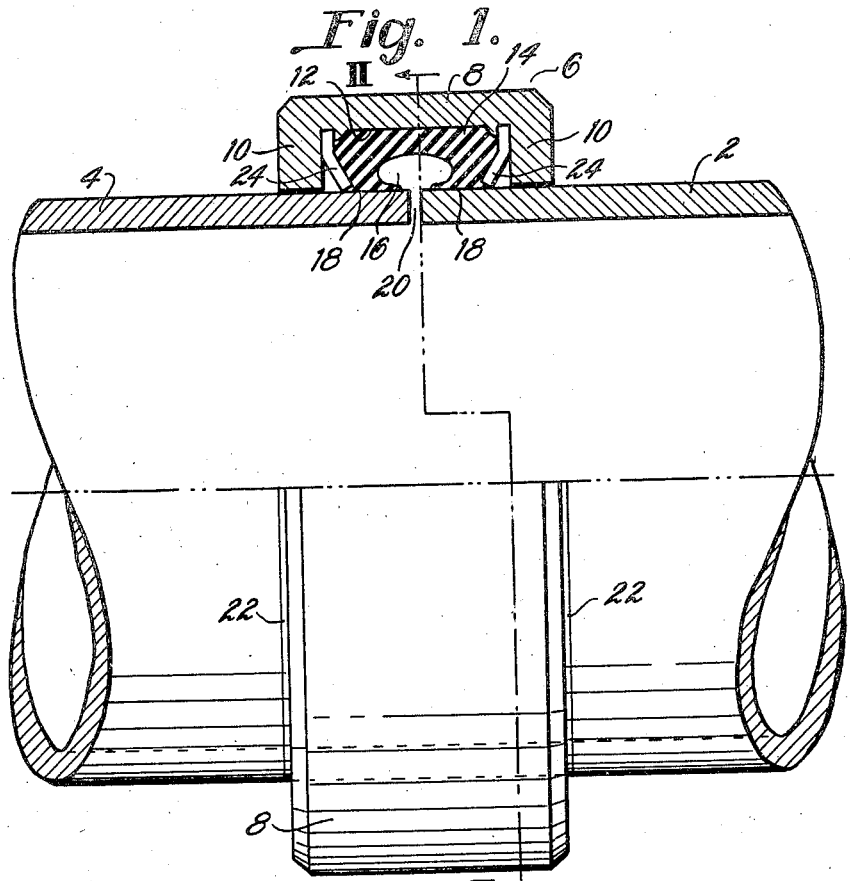
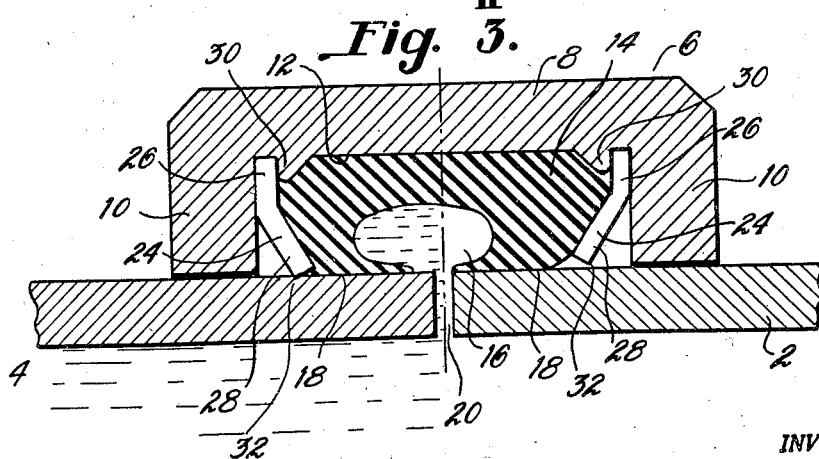
INVENTOR.
James B. Graham
BY Donald G. Dalton
HIS ATTORNEY Dec. 13, 1949 J. B. GRAHAM 2,491,004
PIPE COUPLING
Filed March 5, 1947 2 Sheets-Sheet 2

INVENTOR.
James B. Graham
BY Donald G. Dalton
HIS ATTORNEY

Patented Dec. 13, 1949

2,491,004

UNITED STATES PATENT OFFICE 2,491,004

PIPE COUPLING

James B. Graham, South Hills, Pa., assignor to National Tube Company, a corporation of New Jersey Application March 5, 1947, Serial No. 732,608

1 Claim. (Cl. 285—193)

This inventon relates to pipe couplings and more particularly to quickly connected and disconnected couplings for plain ended pipe.

Among the objects of the present invention is the provision of a pipe coupling which may be quickly and easily applied to plain ended pipe, which is simple to construct, dependable in operation, and easy to manufacture.

A further object of the invention is the provision of a coupling which will permit limited amounts of disalignment between the coupling and the pipe or pipes connected thereto, and which may be easily and effectively assembled in the field with a minimum effort and by the use of simple tools. Included within the meaning of the term "couplings" as used in the following description of the invention, are not only pipe joining means for connecting lengths of pipe end to end but also all other types of fittings for joining pipes to each other, such as ells, tees, crossovers, and so forth.

Frequently temporary pipe lines, such as gathering lines to oil wells, are laid upon the surface of the ground. Another use for such pipe lines is that for irrigation purposes. During the late war, there was a great demand for such lines for the purpose of conveying water and gasoline for advancing armies. All of these uses of surface pipe lines, particularly temporary lines of this character, require pipe joining means of simple, economical design, which are simple to operate, if the lines are to be installed, and removed when necessary, in a fast economical manner.

Previous joints for pipe lines of this type have required skilled labor and a number of tools, some of the prior designs also requiring a groove to be machined in the end of the pipe, which makes difficult the recovery of pipe, from which the end must be cut in the field. Grooves in the ends of pipe to make possible the use of such last named coupling must be cut to considerable depths. This so weakens the pipe that in some instances, where fluid under appreciable pressure is to be carried, heavier pieces of pipe must be welded to the thin pipe and the groove cut into the heavier pipe. It is obvious that such prior designs of pipe coupling are expensive and time-consuming to install and are difficult to remove.

My invention provides pipe couplings particularly useful in temporary pipe lines, such couplings being self-sealing in that they employ expanding packings which are placed into communication with the space within the pipe or pipes joined thereby. Such packings have positioned adjacent thereto gripping members cooperating between the housing and the outer surface of the pipe so as to be wedged therebetween, the relationship of the gripping members and the packing being such that expansion of the packing by the fluid in the pipe causes the gripping members to be wedged between the housing and the pipe. Such design of coupling produces a joint which has a strength which is at least a very substantial part of the strength of the pipe itself. The coupling of the present invention may be used on any thickness of pipe without requiring grooving of the ends or any other machining operation. The coupling has the further advantage of requiring no tools or skilled labor, the pipe to be joined being simply pushed into the coupling to a predetermined extent, fluid pressure thereupon being applied to the interior of the pipe, such fluid pressure expanding the packing and seating the gripping members into position against the pipe, thereby preventing the pipe from pulling out of the coupling. In the preferred embodiments of the coupling of the invention hereinafter described and illustrated, the gripping members are spring urged to pipe releasing position so that upon release of fluid pressure and contraction of the packing they automatically free themselves from engagement with the pipe.

The invention will be more readily understood by reference to the accompanying drawings in which:

Figure 1 is a view partially in elevation and partially in vertical section of two pipes joined end to end by a straight coupling made in accordance with the invention;

Figure 3 is an enlarged view in section of the portion of the coupling shown in section in Figure 1, the right hand portion of the packing and gripping members therein being shown in the position they assume when the packing is free from fluid pressure, and the left hand portion of the figure showing the packing and gripping members in operative joint sealing and pipe gripping position;

Figure 2:
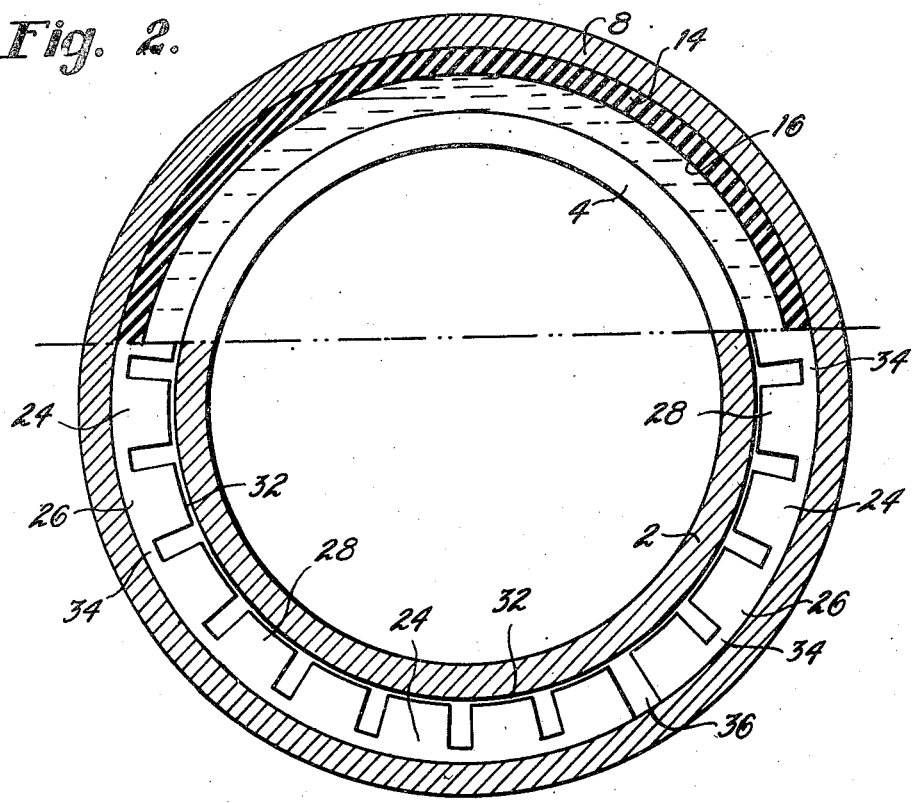
Figure 2 is a view in transverse section through the coupling joint shown in Figure 1, the section being taken along the line II—II of Figure 1.

The embodiments of the couplings of the invention shown in the drawings are adapted for the joining end to end of plain ended pipes. The pipes to be joined are designated 2 and 4, respectively, the coupling being designated generally by the character 6. The coupling includes a main housing portion 8 of relatively heavy section, high strength, material such as steel. The body is in the form of an annulus, the main portion of which is of materially greater diameter than the pipes and the ends of which are in the form of inturned flanges 10 which approach the pipes to be joined and form an annular space or cavity 12 between them, the main portion of the housing, and the pipes to be joined. Within the cavity 12 of the housing of the coupling there is positioned the resilient packing 14 made of an elastomer, such as rubber or synthetic rubber-like materials. The packing 14 is provided with a centrally located cavity 16 having an annular slot 20 through the inner wall thereof and centrally located with respect to the cavity 16 to provide access for the fluid in the pipes to such cavity. The packing is provided with an inner cylindrical surface 18 on either side of slot 20 for cooperation with the ends of the pipes to effect a seal therewith when the packing is expanded by being subjected to internal pressure. The ends of the pipes are preferably provided with circumferential painted lines 22 which indicate the extent to which the pipe ends should be inserted within the coupling to leave a gap between their confronting ends. Whereas the presence of such gap is preferable, the coupling will function satisfactorily even though the pipes be thrust into abutting relationship, so long as they abut in the vicinity of slot 20, since in such case the irregularities of the pipe ends allow sufficient fluid leakage to subject cavity 16 to pressure.

In the first embodiment of the invention, shown in Figures 1, 2, and 3, the pipe gripping members are in the form of leaf springs, disposed radially of housing 8, which themselves furnish the force necessary to release them from engagement with the pipe upon release of fluid pressure in the packing member. Such spring gripping members, designated in these figures as 24, have an outer leg 26 disposed at an obtuse angle with respect to the inner leg 28. The outer leg 26 of each gripping member is secured to the housing 8 by being tripped at its outer end between the inner surface of the inturned flange 10 and the depending projection 30, located near the corner of cavity 12. The gripping members 24 may be formed separately, if desired, or more conveniently, may be connected in annular form as will further appear in the description of Figure 2. After insertion of members 24 in the housing in the position shown, projections 30 may be peened to bring them into tight engagement with leg 26. The inner leg 28 inclines downwardly and inwardly toward the center of the coupling (as shown in Figure 3), so that its lower outer edge 32, which clears the pipe when the packing is free from pressure and thus contracted, as shown in the right hand portion in Figure 3, lies closer to the surface of the pipe than does the inner lower edge thereof. Edge 32 is preferably made sharp, as shown, to gouge somewhat into the surface of the pipe, and is also preferably made of arcuate shape so that it parallels the surface of the pipe to be gripped, affording gripping engagement therebetween over the full extent of gripping edge 32.

As shown in Figure 2, gripping members 24 may be connected in the form of an incomplete annulus, the inner legs 28 being spaced from each other, but the outer legs 26 being connected at their outer ends by portions 34 to allow the insertion of the gripping members in coupling housing 8 in annular connected form as shown in Figure 2. The annulus is provided with a gap or discontinuity 36 so that it may be deformed sufficiently to allow its insertion into the coupling housing, after which it is retained therein by the peening of projections 30 as previously described.

Figure 4:
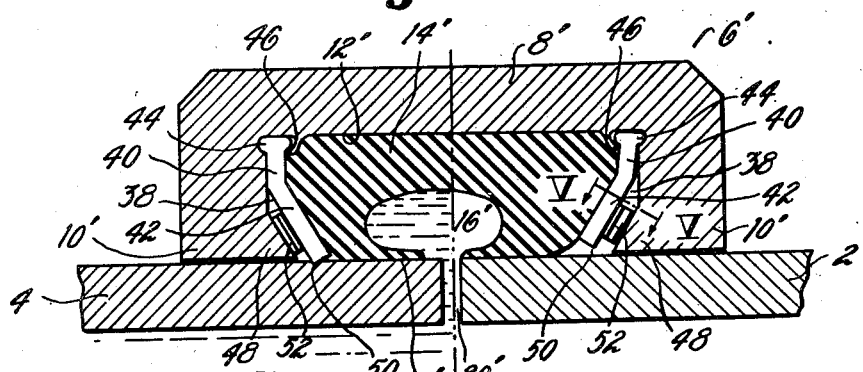
Figure 4 is a view in section similar to Figure 3 of a portion of a coupling employing modified pipe gripping members.
Figure 5:
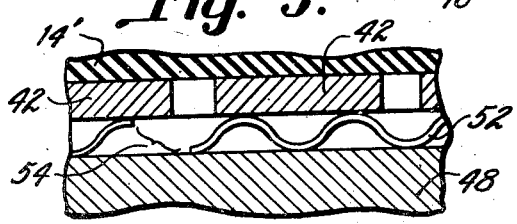
Figure 5 is a view in section of a portion of the coupling member shown in Figure 4, the section being taken along the line V—V in Figure 4.

In the embodiment of the coupling of the invention shown in Figures 4 and 5 the pipe gripping members do not themselves contribute the force necessary to their self-release, in this instance such releasing force being provided by spring means independent of the gripping members. In Figures 4 and 5 elements of the coupling which are the same as those of the coupling shown in Figures 1, 2, and 3 are designated by the same reference characters primed.

The coupling housing 8' is similar to housing 8 except that it is provided on the lower inner surfaces of inturned flanges 10' with angularly disposed spring seats 48. The gripping members 38 are rigid members of strong hard material having an outer leg 40 and an inner leg 42 disposed at an obtuse angle with respect to each other. Members 38 are located in planes radial of the coupling housing, and are mounted for limited pivotal movement about their outer ends by a modified ball and socket joint consisting of the enlarged head 44 on the outer end of leg 40 and the similarly shaped seat located in the upper corner of the cavity in the housing (Figure 4), such seat being completed by the downwardly and outwardly projecting projection 46 on the housing 8'. Projection 46 is initially formed to leave the socket open, and is brought into the shape shown in Figure 4 after the insertion of the enlargement 44 within the socket. The outer lower (as shown in Figure 4) edge 50 of the gripping member 38 is preferably made in the form of a circular arc paralleling the surface of the pipe to be gripped. When the resilient packing member 14' contracts upon release of the fluid pressure in the cavity 16' therein, as shown in the right hand portion of Figure 4, member 38 is allowed to swing clockwise under the action of spring 52 and thus to withdraw the edge 50 of the clamping member from contact with the pipe. When the packing is subjected to pressure, however, as shown in the left hand portion of Figure 4, the outer edge of the packing thrusts the clamping member 38 in such manner as to cause the gripping edge 50 to dig into the surface of the pipe. Once substantial contact has been established between the pipe and such gripping members, the coupling gripping means become self-tightening since an increased thrust of the pipes 2 and 4 away from each other only serves to wedge the gripping members more tightly between the coupling housing and the pipes.

The character of spring 52, which effects release of clamping member 38 upon release of fluid pressure in the packing member is more clearly shown in Figure 5. Such spring is generally in the form of a frusto-conical annulus. The spring is of sinuous shape, the space between adjacent peaks being somewhat less than the width of gripping members 38 so that such members, at least in the main, are backed up by two peaks of the spring, as shown in Figure 5. The spring annulus is left open, as indicated at 54, to allow substantial sliding of the spring ends to compensate for the difference in the length of the spring in its stressed and unstressed positions.

The packing 14 of the first embodiment and the packing 14' of the second embodiment, as stated, is made from rubber or rubber-like material, generically termed an elastomer. The packing may be composed of a natural rubber alone, or of a tire stock, such as the so-called 60% tire stock, containing natural rubber and carbon black. It is also possible to use for such packing any of the so-called synthetic rubbers which are vulcanizable such as polymers of chloroprene, sold under the trade names Neoprene, Sovprene, and GR-M, copolymers of butadiene and styrene, sold under the trade names Perbunan, Buna N, Perbunan Extra, Chemigum III, Hycar OR, and Thiokol RD, and copolymers of isobutylene and butadiene or isoprene, sold under the trade names Butyl or GR-I. It is to be understood that the above list is not exhaustive, and that various other vulcanizable elastomers, natural or synthetic, may be employed. In applications wherein the fluid to be carried in the pipes tends to be solvent to natural rubber, the various synthetic rubbers such as Neoprene may be used to advantage for the packing.

Although the embodiments of pipe couplings of the invention which have been shown and described are of the straight coupling type in which pipes are joined end to end, it is to be understood that the invention is not limited thereto but that it may be employed in all other types of fittings for joining pipes to each other, such as L's, T's, and crossovers, and so forth. Accordingly, although I have disclosed and illustrated prefered embodiments of the pipe coupling of my invention it will be understood that the invention is not to be limited thereto, but that it is defined within the scope of the following claim.

I claim:

A pipe coupling for joining pipes end to end comprising an annular body adapted to receive the ends of two aligned pipes, said body being substantially U-shaped in axial section and having an annular recess therein around the pipe receiving space, said body being provided with a slot at the base of each of the legs of the U-shaped body communicating with said annular recess, a deformable annular packing member made of an elastomer in said recess, the packing member having a cavity therein communicating with the space within the pipes, the inner surface of the packing member being adapted to cooperate with the outer surfaces of the pipes therein to seal the joint therebetween when the cavity in the packing member is subjected to fluid pressure, and pipe gripping means in the coupling actuated by the deformable packing member, such gripping means comprising a plurality of radially positioned hard, strong pipe gripping members contiguous to the outer edge of the packing member and disposed about the pipe end, said gripping members being mounted each with its outer end fitted in said slot at the base of the leg of the coupling body, the inner ends of the gripping members being free for movement into pipe engaging position by expansion of the packing member when the cavity in the latter is subjected to fluid pressure, and for movement away from said pipes to release them upon release of the fluid pressure from the cavity in the packing member and the consequent contraction of the latter.

JAMES B. GRAHAM.

REFERENCES CITED

The following references are of record in the file of this patent:

UNITED STATES PATENTS

| Number | Name | Date |
|---|---|---|
| 1,818,985 | Burnish | Aug. 18, 1931 |
| 1,857,297 | Faulkner | May 10, 1932 |
| 2,230,725 | Nathan | Feb. 4, 1941 |
| 2,341,164 | Shimek | Feb. 8, 1944 |

Certificate of Correction

Patent No. 2,491,004                                    December 13, 1949

JAMES B. GRAHAM

It is hereby certified that errors appear in the printed specification of the above numbered patent requiring correction as follows:

Column 3, line 39, for "leak" read *leaf*; line 48, for "tripped" read *gripped*;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*